(12) United States Patent
Carolan et al.

(10) Patent No.: US 10,053,755 B2
(45) Date of Patent: Aug. 21, 2018

(54) SUPER-HARD STRUCTURE, TOOL ELEMENT AND METHOD OF MAKING SAME

(75) Inventors: Declan John Carolan, Dublin (IE); Neal Murphy, Dublin (IE); Alojz Ivankovic, Dublin (IE)

(73) Assignee: Element Six Limited (IE)

( * ) Notice: Subject to any disclaimer, the term of this patent is extended or adjusted under 35 U.S.C. 154(b) by 0 days.

(21) Appl. No.: 14/116,870

(22) PCT Filed: May 25, 2012

(86) PCT No.: PCT/EP2012/059848
§ 371 (c)(1),
(2), (4) Date: Jul. 16, 2014

(87) PCT Pub. No.: WO2012/163835
PCT Pub. Date: Dec. 6, 2012

(65) Prior Publication Data
US 2014/0325915 A1    Nov. 6, 2014

(30) Foreign Application Priority Data

May 27, 2011 (GB) .................................. 1108967.9

(51) Int. Cl.
*B24D 3/02* (2006.01)
*C09C 1/68* (2006.01)
(Continued)

(52) U.S. Cl.
CPC ............. *C22C 26/00* (2013.01); *B24D 18/00* (2013.01); *C01B 21/0648* (2013.01);
(Continued)

(58) Field of Classification Search
None
See application file for complete search history.

(56) References Cited

U.S. PATENT DOCUMENTS 4,374,651 A * 2/1983 Lee et al. .................. 51/309
5,326,380 A * 7/1994 Yao ........................... B24D 3/06
                                                                51/309
(Continued)

FOREIGN PATENT DOCUMENTS

GB     2337763 A    12/1999
GB     2384259 A    7/2002
(Continued)

OTHER PUBLICATIONS

Ivanovskii, Alexander L.; Shein, Igor R.; "Elastic properties of mono- and polycrystalline hexagonal AlB2-like diborides of s, p and d metals from first-principles calculations" J. Phys.: Condens. Matter 20 (2008) pp. 1-9.*

(Continued)

*Primary Examiner* — Colleen P Dunn
*Assistant Examiner* — Ross J Christie
(74) *Attorney, Agent, or Firm* — Armstrong Teasdale LLP

(57) ABSTRACT

A method for treating a super-hard structure, the method including heating the super-hard structure to a treatment temperature of at least 500 degrees centigrade and cooling the super-hard structure from the treatment temperature to a temperature of less than 200 degrees centigrade at a mean cooling rate of at least 1 degree centigrade per second and at most 100 degrees centigrade per second to provide a treated super-hard structure. A PCBN structure produced by the method may have flexural strength of at least 650 MPa.

7 Claims, 3 Drawing Sheets

(51) Int. Cl.
*C09K 3/14* (2006.01)
*C22C 26/00* (2006.01)
*C04B 35/52* (2006.01)
*C04B 35/5831* (2006.01)
*B24D 18/00* (2006.01)
*C01B 21/064* (2006.01)

(52) U.S. Cl.
CPC .......... *C04B 35/52* (2013.01); *C04B 35/5831* (2013.01); *C04B 2235/3804* (2013.01); *C04B 2235/386* (2013.01); *C04B 2235/3826* (2013.01); *C04B 2235/3843* (2013.01); *C04B 2235/3856* (2013.01); *C04B 2235/3865* (2013.01); *C04B 2235/3886* (2013.01); *C04B 2235/427* (2013.01); *C04B 2235/5436* (2013.01); *C04B 2235/5445* (2013.01); *C04B 2235/6565* (2013.01); *C04B 2235/80* (2013.01); *C04B 2235/96* (2013.01); *C04B 2235/9615* (2013.01); *C22C 2026/003* (2013.01); *C22C 2026/005* (2013.01); *C22C 2026/006* (2013.01); *C22C 2026/007* (2013.01)

(56) References Cited

U.S. PATENT DOCUMENTS

| | | | |
|---|---|---|---|
| 5,398,639 A * | 3/1995 | Doll | C30B 1/00 117/10 |
| 5,453,105 A | 9/1995 | Middlemiss et al. | |
| 5,510,193 A * | 4/1996 | Cerutti et al. | 428/552 |
| 5,641,921 A * | 6/1997 | Dennis | B22F 3/105 51/309 |
| 5,848,348 A * | 12/1998 | Dennis | B22F 3/105 419/11 |
| 6,179,886 B1 | 1/2001 | Gordeev et al. | |
| 6,374,932 B1 | 4/2002 | Brady | |
| 6,428,249 B1 * | 8/2002 | Chae | B23K 31/025 407/118 |
| 6,447,852 B1 | 9/2002 | Gordeev et al. | |
| 6,517,902 B2 | 2/2003 | Drake et al. | |
| 6,616,725 B2 * | 9/2003 | Cho et al. | 51/307 |
| 6,517,901 B1 | 11/2003 | Drake et al. | |
| 6,709,747 B1 | 3/2004 | Gordeev et al. | |
| 6,919,040 B2 | 7/2005 | Fries et al. | |
| 7,008,672 B2 | 3/2006 | Gordeev et al. | |
| 7,434,439 B2 * | 10/2008 | Zurecki | 72/342.3 |
| 7,867,438 B2 | 1/2011 | Can et al. | |
| 2003/0191533 A1 * | 10/2003 | Dixon | A61F 2/30767 623/17.14 |
| 2004/0060243 A1 * | 4/2004 | Fries et al. | 51/293 |
| 2005/0050801 A1 * | 3/2005 | Cho et al. | 51/293 |
| 2009/0080986 A1 * | 3/2009 | Can et al. | 51/307 |
| 2010/0069225 A1 * | 3/2010 | Kountanya | C04B 35/5831 501/96.4 |

FOREIGN PATENT DOCUMENTS

| | | | |
|---|---|---|---|
| GB | 2423320 A | 8/2006 | |
| KR | 20100022072 A | 2/2010 | |
| WO | WO 2006032984 A2 * | 3/2006 | .......... C04B 35/624 |
| WO | 2008142656 A1 | 11/2008 | |
| WO | 2009/013713 A2 | 1/2009 | |

OTHER PUBLICATIONS

De Oliveria, C.A.S.; Suski, Cassio A.; "Tribology in Manufacturing Technology: Chapter 6 Coatings and Applications" Springer-Verlag ed. (2012) pp. 175-194.*
http://accuratus.com/alumni.html; Accuratus: Aluminum Nitride: AlN Material Properties (Sep. 7, 2016).*
Wang, C.; "Materials Engineering: Chapter 16 Composite Materials" (Fall 2016).*
Search Report for GB1209193.0 dated Sep. 18, 2012.
Evelyn et al., "Elastic properties of polycrystalline cubic boron nitride and diamond," Diamond and Related Materials , 6, 1997, p. 812-816.
International Search Report for PCT/EP2012/059848 dated Sep. 9, 2012.

* cited by examiner

SUPER-HARD STRUCTURE, TOOL ELEMENT AND METHOD OF MAKING SAME

CROSS-REFERENCE TO RELATED APPLICATIONS

This application is a § 371 National Stage of International Application No. PCT/EP2012/059848, filed May 25, 2012, which claims priority to Great Britain Application No. 1108967.9, filed May 27, 2011.

This disclosure relates generally to super-hard structures, tool elements comprising super-hard structures and methods for making same.

Polycrystalline diamond (PCD) material and polycrystalline cubic boron nitride (PCBN) material are examples of super-hard material. PCBN material comprises grains of cubic boron nitride (cBN) material embedded in a matrix, which may comprise metal and or ceramic material. PCD material comprises grains of diamond, a substantial number of which are directly bonded to each other. Super-hard constructions may comprise PCD or PCBN structures integrally formed with a cemented carbide substrate. Some super-hard constructions may tend to become dimensionally distorted when processed to form an element for a tool.

U.S. Pat. No. 6,517,902 discloses a form of heat treatment for preform elements having a facing table of polycrystalline diamond bonded to a substrate of cemented tungsten carbide with a cobalt binder. The substrate includes an interface zone with at least 30 percent by volume of the cobalt binder in a hexagonal close packed crystal structure.

Viewed from a first aspect there is provided a method for treating a super-hard structure, for example a super-hard structure comprising or consisting of PCBN material, the method including heating the super-hard structure to a treatment temperature of at least about 500 degrees centigrade and cooling (quenching) the super-hard structure from the treatment temperature to less than 200 degrees centigrade or to ambient temperature at a mean cooling (quench) rate of at most about 100 degrees centigrade per second. The cooling rate may be at least about 1 degree centigrade per second or at least about 5 degrees per second.

Various combinations and variations are envisaged by this disclosure for a method of treating a super-hard structure, non-limiting and non-exhaustive examples of which are as follows.

In some examples, the super-hard structure may comprise PCBN material or PCD material, for example thermally stable PCD material, or material comprising a plurality of diamond grains dispersed in a matrix comprising SiC material. In some examples, the super-hard structure may comprise at least 40 volume percent and at most 80 volume percent cBN grains; the super-hard structure may comprise cBN grains having a mean size of at most 25 microns; the super-hard structure may comprise cBN grains dispersed in a matrix comprising as least one material selected from titanium carbide, titanium nitride, titanium carbonitride, boride of aluminium and nitride of aluminium; the super-hard structure may comprise a matrix, the matrix comprising material or combination of materials having a combined mean Young's modulus of at most about 350 GPa, and or the super-hard structure may comprise a matrix, the matrix comprising material or combination of materials having a combined mean coefficient of thermal expansion of at least about $4.5 \times 10^{-6}$/K.

In some versions, the super-hard structure may comprise a PCBN structure, which may comprise at least about 30 volume percent and at most about 80 volume percent cBN grains. The cBN grains may have a mean size of at most about 25 microns, at most about 10 microns, at most about 5 microns, or at most about 2 microns. The PCBN may comprise cBN grains dispersed in a matrix comprising titanium carbide, titanium nitride, titanium carbonitride, boride of aluminium or titanium and or nitride of aluminium, or any combination of any of these materials. An example PCBN structure may comprise or consist essentially of cBN grains dispersed in a matrix comprising material including Ti and material including Al, the content of the cBN grains being at least about 45 volume percent and at most about 75 volume percent of the PCBN structure. In one version of the example, the matrix may consist of material including Ti and material including Al, apart from unavoidable minor amounts of other material and impurities (i.e. consist essentially of material including Ti and material including Al).

In some examples, the super-hard structure may comprise a PCBN structure, which may comprise material or combination of materials having a (combined mean) Young's modulus of at most about 350 GPa or at most about 300 GPa. The matrix may comprise material or combination of materials having a (combined mean) coefficient of thermal expansion of at least about $4.5 \times 10^{-6}$/K or at least about $8 \times 10^{-6}$/K.

In example versions, the treatment temperature may be at least about 600 degrees centigrade or at least about 700 degrees centigrade. The treatment temperature may be at most about 1,100 degrees centigrade.

An example method may include cooling the super-hard structure to a temperature of at most about 200 degrees centigrade or at most about 100 degrees centigrade at mean quench rate of at most about 50 degrees centigrade per second, 20 degrees centigrade per second or at most about 10 degrees centigrade per second. Prior to quenching, the PCBN structure may be heated to the temperature for a period of at least about 1 minute, at least about 5 minutes or at least about 10 min, so that the PCBN structure may be at substantially the same temperature throughout its volume.

In some examples, the super-hard structure may be cooled by contacting it with a fluid having a thermal conductivity at 20 degrees centigrade of at most about 0.4 W/(m·K). The super-hard structure may be cooled by contacting it with oil.

In one example method, the super-hard structure may comprise or consist essentially of a PCBN structure and may be cooled by contacting it with a fluid having a thermal conductivity substantially less than that of water (for example, substantially less than about 0.6 W/(m·K) at 20 degrees centigrade). In one particular example, the fluid has thermal conductivity of at most about 0.4 W/(m·K) or at most about 0.2 W/(m·K) at 20 degrees centigrade, and in some versions the PCBN structure may be cooled by contacting it with oil or polymeric solutions designed for controlled-rate quenching. Particular versions may include immersing the PCBN structure in the fluid, spraying or pouring the fluid onto the PCBN structure. The fluid may flow over the PCBN structure at a controlled (constant or varying) rate, or the fluid may be substantially static with respect to the PCBN structure.

In some examples, the method may include heating the treated super-hard structure to a temperature of at least about 500 degrees centigrade for a period of at least about 5 minutes.

In some examples, the method may include re-heating a cooled super-hard structure to a reheat temperature of at least about 500 degrees centigrade, at least about 600 degrees centigrade or at least about 700 degrees centigrade, or to the temperature from which it had been cooled. In some versions, the super-hard structure may be maintained at the reheat temperature for at least about 5 minutes, at least about 10 minutes, at least about 30 minutes or at least about 1 hour.

In some examples, the method may include processing the treated super-hard structure to form an element for a tool. In one example, the method may include processing the treated super-hard structure to form an element for a tool that can be further processed to form an insert for a machine tool or other cutting or drilling tool. For example, the treated super-hard construction may be cut by means of a laser, by electro-discharge machining (EDM) or other means to form an element for a tool, which may be further processed, for example by grinding. Cutting the treated super-hard construction after heat treatment is likely to result in an element for a tool having improved dimensional tolerance as compared to cutting the super-hard construction before heat treatment.

Viewed from a second aspect there is provided a PCBN structure having a flexural strength of at least about 650 MPa, at least about 700 MPa or at least about 800 MPa.

Various combinations and arrangements of super-hard structures are envisaged by the this disclosure, of which the following are non-limiting and non-exhaustive examples.

The PCBN structure may comprise at least about 40 volume percent and at most 80 volume percent cBN grains; the PCBN structure may comprise cBN grains having a mean size of at most about 25 microns, and or the PCBN structure may comprise cBN grains dispersed in a matrix comprising as least one material selected from titanium carbide, titanium nitride, titanium carbonitride, boride of aluminium and nitride of aluminium.

The method and variations thereof according to the first aspect are likely to produce enhanced super-hard structures according to the second aspect.

Non-limiting examples are described below with reference to the accompanying drawings, of which:

Figure 1:
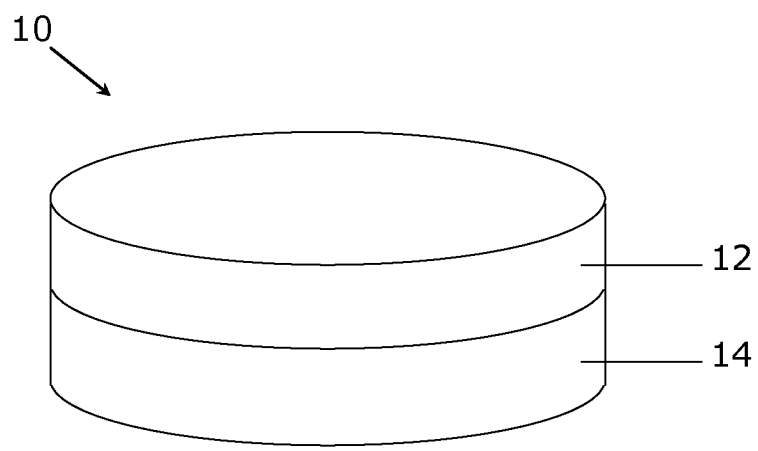
FIG. 1 shows a perspective view of an example PCBN construction.
Figure 2:
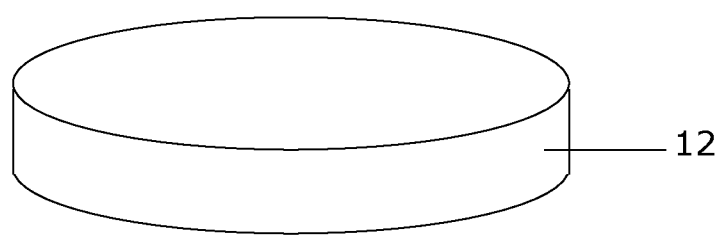
FIG. 2 shows a perspective view of an example PCBN structure.

The super-hard structure may consist essentially of a PCBN structure and may be joined to a substrate such as a cemented carbide substrate or the PCBN structure may be substantially free-standing and not joined to a substrate. With reference to FIG. 1, an example PCBN construction 10 comprises a PCBN structure 12 joined to a cemented carbide substrate 14. With reference to FIG. 2, an example PCBN structure 12 may have a generally disc-like shape and is free-standing (not joined to a substrate).

Example methods of providing PCBN constructions can be found in U.S. Pat. No. 7,867,438.

Figure 3:
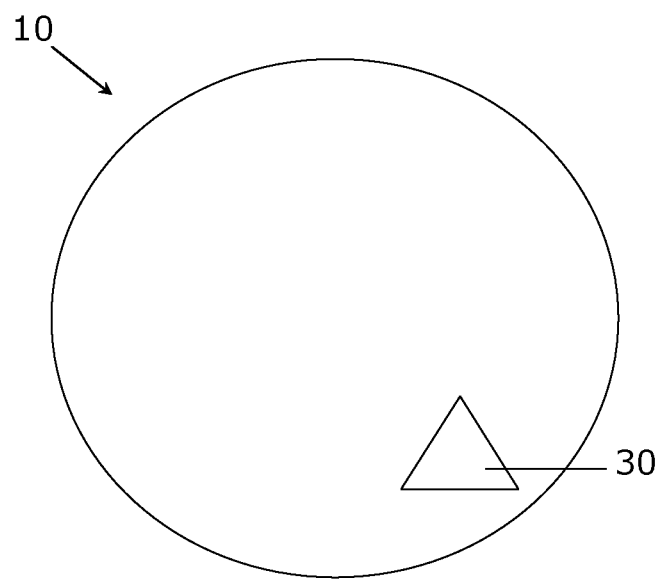
FIG. 3 shows a plan view of an example PCBN construction with and example PCBN element cut therefrom.
Figure 4:
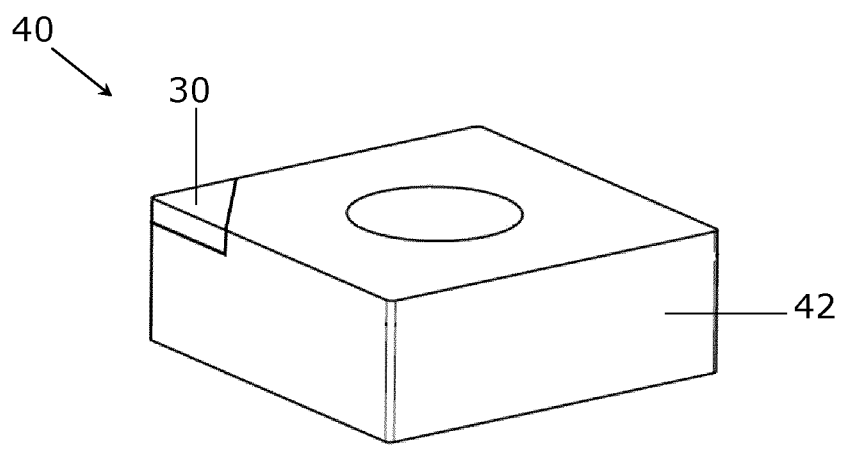
FIG. 4 shows a perspective view of an example tool insert comprising a PCBN element.

With reference to FIG. 3, a treated PCBN construction 10 may be cut and or otherwise processed to produce a PCBN element 30 for a tool insert. FIG. 4 shows a tool insert 40 comprising a PCBN element 30 joined to a carrier body 42.

A non-limiting example is described below in more detail below.

Two sets of 46 rectangular specimens of two respective grades of PCBN material were provided, each specimen having length 28.5 mm, width 6.25 mm and thickness 4.76 mm were prepared. The first set consisted of PCBN specimens of a first grade (or type) of PCBN material comprising about 50 volume percent cBN grains having mean size of about 0.7 micron to about 1 micron dispersed in a matrix consisting substantially of titanium carbonitride material and borides of aluminium. The second set consisted of PCBN specimens of a second grade of PCBN material comprising about 84 volume percent cBN grains having mean size of about 22 microns dispersed in a matrix comprising substantially nitrides and borides of aluminium. The PCBN specimens in both the first and second sets consisted only of a free-standing PCBN structure (i.e. they were not joined to a substrate). Properties of the matrix materials of the respective specimen PCBN materials are summarised in table 1 below.

TABLE 1

| | Matrix material of the first grade of PCBN material | Matrix material of the second grade of PCBN material |
| --- | --- | --- |
| Young's modulus, GPa | 315 | 250 |
| Poisson's ratio | 0.2 | 0.2 |
| Thermal expansion coefficient, $10^{-6}$/K | 4.8 | 9.4 |

Fifteen specimens from each of the sets were subjected to a flexural strength test without having been treated. The flexural strength was measured using three point bending and calculated in accordance with the British Standard for determination of flexural strength of monolithic ceramics, standard number BS-EN 843:1. The mean flexural strength of the untreated specimens from the first set was found to be about 430 MPa and that of the untreated specimens from the second set was found to be about 630 MPa.

The remaining specimens in each set were subjected to a variety of heat and subsequent quench (cooling) treatments, including quench by means of water and quench by means of light oil. Quenching was carried out on different specimens from various temperatures in the range from 240 degrees centigrade to 1,100 degrees centigrade, to which temperature the respective specimens had been heated in a furnace for a period of about ten minutes. Quenching was carried out by removing the specimens from the furnace and plunging them into a large reservoir containing water or light grade oil at a temperature of 20 degrees centigrade. The range of temperature differences used was therefore from 220 degrees centigrade (i.e. reduction in temperature from 240 to 20 degrees centigrade) to 1,080 degrees centigrade (i.e. from 1,100 to 20 degrees centigrade).

The quench rate where water was used is estimated to be about 1,000 degrees centigrade per second and the quench rate where light oil was used is estimated to be about 10 degrees centigrade per second. The treated specimens were then subjected to flexural strength tests to measure their flexural strengths.

In the case of the specimens from the first set, all treatments including heating the them to 1,080 degrees centigrade for two hours followed by quenching with water resulted in reduction of the flexural strength by about 20% as compared to the untreated specimens of the first set, while quenching by means of oil resulted in no change in the flexural strength.

Figure 5:
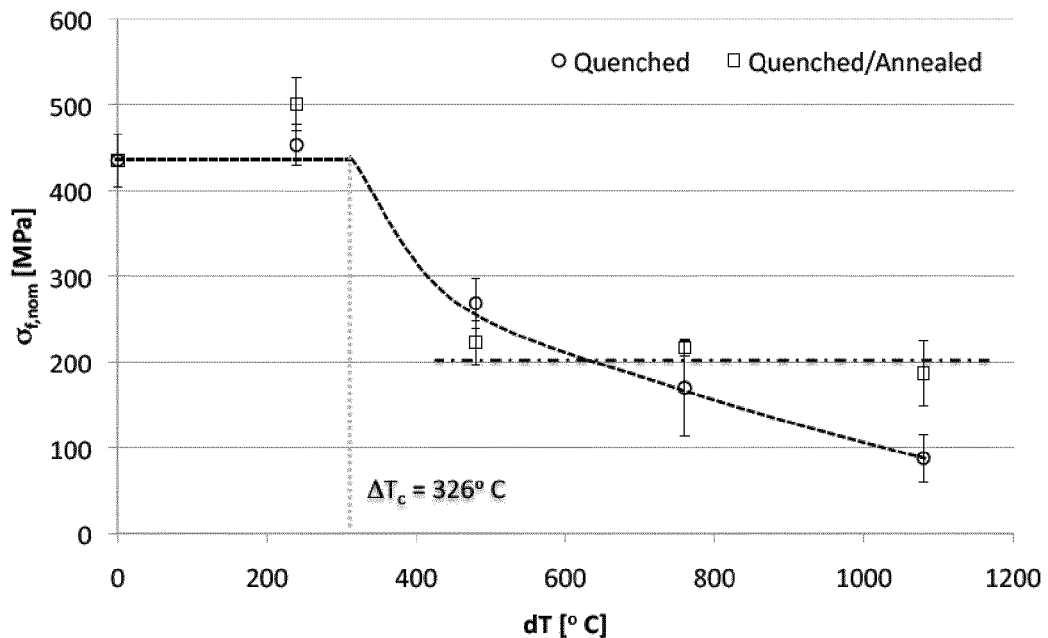
FIG. 5 shows a graph of measured flexural strength of a PCBN structure as function of quench temperature difference.

Some of the specimens quenched using water were subsequently annealed by heating them back up to the temperature from which they were quenched and maintained at that temperature for about one hour, after which their flexural strength was again measured. The flexural strength of the specimens from the first set following quenching by water and subsequent annealing from the quench temperature as a function of quench temperature difference is shown in FIG. 5.

Figure 6:
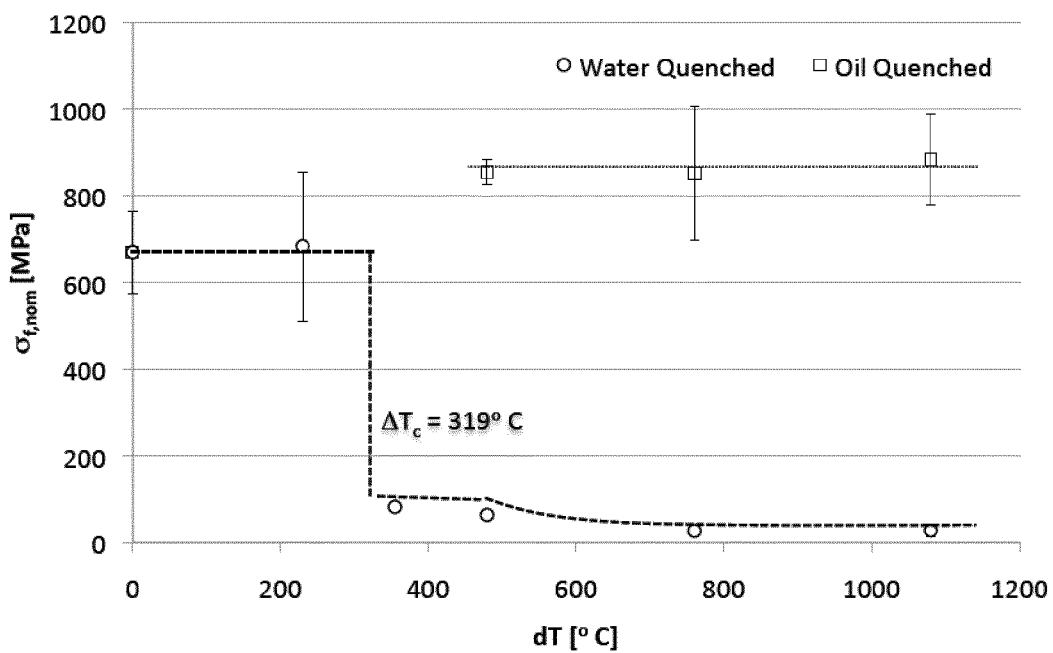
FIG. 6 shows a graph of measured flexural strength of a PCBN structure as function of quench temperature difference.

In the case of the specimens from the second set, treatments including heating the specimens to 1,080 degrees centigrade for two hours followed by quenching with water also resulted in reduction of flexural strength, but quenching with oil resulted in a substantial increase in the mean flexural strength, from about 630 MPa to about 830 MPa. The flexural strength of the specimens of the second set following quenching in water and (different) specimens of the second set quenched in oil is shown in FIG. 6 as functions of the quench temperature difference.

Rapid quenching of the specimens of the second set with water, in which the quench temperature difference was between 240 degrees centigrade and 375 degrees centigrade, resulted in a large and discontinuous decrease in flexural strength. No substantial change in flexural strength was evident when the quench temperature difference was less than 240 degrees centigrade. Where the quench temperature difference using water was 780 degrees centigrade, the resultant flexural strength was about 25 GPa, which is very low. It was observed that the failure of these last mentioned specimens corresponded to very low energy and the fracture initiated in a central region of the specimen. The failed material also exhibited long unopened cracks extending from the initiation site to the edge of the sample. A significant change in surface colour from dark grey to light blue was also observed, and microscopic investigation revealed significant microscopic voids close to the surface of the specimens.

Certain terms as used herein will briefly be explained.

As used herein, "super-hard" or ultra-hard material has Vickers hardness of at least about 25 GPa. Synthetic and natural diamond, polycrystalline diamond (PCD), cubic boron nitride (cBN) and polycrystalline cBN (PCBN) material are examples of super-hard materials. Synthetic diamond, which is also called man-made diamond, is diamond material that has been manufactured. Other examples of super-hard materials include certain composite materials comprising diamond or cBN grains held together by a matrix comprising ceramic material, such as silicon carbide (SiC), or by cemented carbide material such as Co-bonded WC material (for example, as described in U.S. Pat. No. 5,453,105 or 6,919,040). For example, certain SiC-bonded diamond materials may comprise at least about 30 volume percent diamond grains dispersed in a SiC matrix (which may contain a minor amount of Si in a form other than SiC). Examples of SiC-bonded diamond materials are described in U.S. Pat. Nos. 7,008,672; 6,709,747; 6,179,886; 6,447,852; and International Application publication number WO2009/013713).

PCBN material comprises grains of cubic boron nitride (cBN) dispersed within a matrix comprising metal or ceramic material. For example, PCBN material may comprise at least about 35 volume percent or at least about 50 volume percent cBN grains dispersed in a matrix material comprising a Ti-containing compound, such as titanium carbide, titanium nitride, titanium carbonitride and/or an Al-containing compound, such as aluminium nitride, and/or compounds containing metal such as Co and/or W. Some versions (or "grades") of PCBN material may comprise at least about 80 volume percent or even at least about 90 volume percent cBN grains.

Polycrystalline diamond (PCD) material comprises a mass (i.e. an aggregation of a plurality) of diamond grains, a substantial portion of which are directly inter-bonded with each other and in which the content of diamond is at least about 80 volume percent of the material. Interstices between the diamond grains may be at least partly filled with a binder material comprising catalyst material for synthetic diamond, or they may be substantially empty. A catalyst material for synthetic diamond is capable of promoting the growth of synthetic diamond grains and or the direct intergrowth of synthetic or natural diamond grains at a temperature and pressure at which synthetic or natural diamond is thermodynamically stable. Examples of catalyst materials for diamond are Fe, Ni, Co, Mn and certain alloys including these. Super-hard structures comprising PCD material may comprise at least a region from which catalyst material has been removed from the interstices, leaving interstitial voids between the diamond grains. PCD material may be made by a process including providing an aggregate mass of diamond grains having a size distribution suitable for the grade, optionally introducing catalyst material or additive material into the aggregate mass, and subjecting the aggregated mass in the presence of a source of catalyst material for diamond to a pressure and temperature at which diamond is more thermodynamically stable than graphite and at which the catalyst material is molten. Under these conditions, molten catalyst material may infiltrate from the source into the aggregated mass and is likely to promote direct intergrowth between the diamond grains in a process of sintering, to form a PCD structure. The aggregate mass may comprise loose diamond grains or diamond grains held together by a binder material. Different PCD grades may have different microstructure and different mechanical properties, such as elastic (or Young's) modulus E, modulus of elasticity, transverse rupture strength (TRS), toughness (such as so-called K1C toughness), hardness, density and coefficient of thermal expansion (CTE). Different PCD grades may also perform differently in use. For example, the wear rate and fracture resistance of different PCD grades may be different.

Thermally stable PCD material comprises at least a part or volume of which exhibits no substantial structural degradation or deterioration of hardness or abrasion resistance after exposure to a temperature above about 400 degrees centigrade, or even above about 700 degrees centigrade. For example, PCD material containing less than about 2 weight percent of catalyst metal for diamond such as Co, Fe, Ni, Mn in catalytically active form (e.g. in elemental form) may be thermally stable. PCD material that is substantially free of catalyst material in catalytically active form is an example of thermally stable PCD. PCD material in which the interstices are substantially voids or at least partly filled with ceramic material such as SiC or salt material such as carbonate compounds may be thermally stable, for example. PCD structures having at least a significant region from which catalyst material for diamond has been depleted, or in which catalyst material is in a form that is relatively less active as a catalyst, may be described as thermally stable PCD.

As explained above, PCD material and PCBN material may be provided by sintering a plurality of diamond or cBN grains respectively in the presence of a suitable binder or catalyst material onto a substrate, such as a cemented carbide substrate. The PCD or PCBN structure thus produced is likely to be formed joined to the substrate, being an integral part of a construction comprising the PCD or PCBN structure bonded to the substrate during the process in which the respective structure formed into a sintered body.

The invention claimed is:

1. A method for treating a super-hard structure comprising PCBN material, the PCBN material comprising a plurality of cubic boron nitride (cBN) grains and a matrix, the matrix consisting of material selected from the group consisting of of titanium carbide, titanium nitride, titanium carbonitride, boride of aluminium, nitride of aluminium or combinations thereof, the matrix having a combined mean coefficient of thermal expansion of at least $4.5\times10^{-6}$ per Kelvin (/K), the method including heating the super-hard structure to a treatment temperature of at least 500 degrees centigrade and cooling the super-hard structure from the treatment temperature to a temperature of less than 200 degrees centigrade at a mean cooling rate of at least 1 degree centigrade per second and at most 100 degrees centigrade per second to provide a treated super-hard structure, wherein the cooling is done by quenching in oil.

2. A method as claimed in claim 1, in which the super-hard structure is cooled by contacting it with said oil having a thermal conductivity of at most 0.4 Watts per meter Kelvin (W/mK) at 20 degrees centigrade.

3. A method as claimed in claim 1, in which the super-hard structure comprises at least 40 volume percent and at most 80 volume percent cBN grains.

4. A method as claimed in claim 1, in which the super-hard structure comprises cBN grains having a mean size of at most 25 microns.

5. A method as claimed in claim 1, wherein the matrix comprises material or a combination of materials having a combined mean Young's modulus of at most 350 Gigapascals (GPa).

6. A method as claimed in claim 1, including heating the treated super-hard structure to a temperature of at least 500 degrees centigrade for a period of at least 5 minutes.

7. A method as claimed in claim 1, including processing the treated super-hard structure to form an element for a tool.

* * * * *